US007267286B2

(12) United States Patent
Choong et al.

(10) Patent No.: US 7,267,286 B2
(45) Date of Patent: Sep. 11, 2007

(54) SYSTEM AND METHOD FOR BATCH CONVERSION OF RFID TAG TO RFID LABEL

(76) Inventors: Alex Poh Teck Choong, 52, Bukit Batok East Ave 5 10201, Singapore (SG) 659802; Siang Beng Chng, 702, West Coast Road, #13-349, Singapore (SG) 120702; Seng Hwee Koh, Blk 304, Shunfu Road, #09-79, Singapore (SG) 570304

( * ) Notice: Subject to any disclaimer, the term of this patent is extended or adjusted under 35 U.S.C. 154(b) by 337 days.

(21) Appl. No.: 11/063,756

(22) Filed: Feb. 23, 2005

(65) Prior Publication Data
US 2006/0060657 A1 Mar. 23, 2006

(30) Foreign Application Priority Data
Sep. 17, 2004 (WO) .............. PCT/SG2004/000302

(51) Int. Cl.
*G06K 19/06* (2006.01)
(52) U.S. Cl. .................. 235/492; 235/487; 235/451
(58) Field of Classification Search ................ 235/492, 235/487, 475, 485, 451; 156/361–363; 340/572.1
See application file for complete search history.

(56) References Cited

U.S. PATENT DOCUMENTS

| 5,823,464 | A | 10/1998 | Bohn et al. ............. 242/615.21 |
|---|---|---|---|
| 6,237,217 | B1 | 5/2001 | Bohn et al. .................... 29/806 |
| 6,280,544 | B1* | 8/2001 | Fox et al. ...................... 156/64 |
| 6,357,503 | B1 | 3/2002 | Kromer et al. ............. 156/351 |
| 6,451,154 | B1 | 9/2002 | Grabau et al. ............. 156/300 |
| 6,588,476 | B1 | 7/2003 | Bohn et al. .................. 156/378 |
| 6,645,327 | B2 | 11/2003 | Austin et al. .................. 156/64 |
| 6,857,714 | B2* | 2/2005 | Hohberger et al. ............ 347/2 |
| 7,176,799 | B1* | 2/2007 | Golicz et al. ............ 340/572.1 |
| 2002/0195194 | A1 | 12/2002 | Grabau et al. ............. 156/300 |
| 2003/0136503 | A1 | 7/2003 | Green et al. ................ 156/264 |
| 2004/0026024 | A1* | 2/2004 | Nakasaka et al. ........... 156/250 |
| 2004/0141790 | A1* | 7/2004 | Waters ....................... 400/611 |
| 2005/0167044 | A1* | 8/2005 | Exeter et al. ............... 156/302 |
| 2005/0205202 | A1* | 9/2005 | Chaoui et al. .............. 156/269 |

FOREIGN PATENT DOCUMENTS

| CA | 2209652 | 8/1998 |
|---|---|---|
| JP | 2002-298104 | 10/2002 |
| WO | 02/063551 | 8/2002 |
| WO | 03/105063 | 12/2003 |
| WO | 2004/061753 | 7/2004 |
| WO | 2005/028203 | 3/2005 |

* cited by examiner

*Primary Examiner*—Daniel Stcyr
*Assistant Examiner*—Edwyn Labaze
(74) *Attorney, Agent, or Firm*—Nields & Lemack

(57) ABSTRACT

A system for batch conversion of RFID tag onto a label in a liner, to produce a RFID label, the system having at least a RFID tag dispenser having a plurality of RFID tags, a liner having a plurality of labels, each label spaced apart and marked with pitch marks, a bar code printer and electrical motor to move the liner forward. The system has additionally, a pitch mark sensor and a PLC controller. The pitch mark sensor detects the position of the pitch marks of a label, then sends a signal to the RFID tag dispenser to issue a RFID tag, moving the plurality of RFID tags along towards the liner, causing the RFID tag to be embedded onto the label to produce the RFID label.

13 Claims, 5 Drawing Sheets

SYSTEM AND METHOD FOR BATCH CONVERSION OF RFID TAG TO RFID LABEL

TECHNICAL FIELD

The present invention is related to a method to convert RFID tag to RFID label for batches of RFID labels whereby RFID tags are embedded into paper labels of varying sizes, in accordance to customer requirements.

BACKGROUND ART

Radio Frequency Identification (RFID) uses a smart tag capable of transmitting data by radio. The basic RFID system consists of 3 components:

An antenna or coil

A transceiver (with decoder)

A transponder tag (called a RFID tag) electronically programmed with unique information The basic feature of a RFID tag is to detect the interrogation field or transmission in order to affect a response for data transfer. The main components in a RFID tag circuitry essentially comprises of the following elements:

The antenna and radio frequency receiver and transmission circuit

Micro-processing circuit for control and data management purpose.

Memory, appropriate to data carrier and functionality needs.

There are basically 3 types of RFID transponders that are most widely used in the world. They are (a) contactless cards, (b) contactless tickets and (c) smart labels.

A smart RFID label has a transponder device with a programmable microchip and an antenna. Data can be read or written with a reader device, without a direct line of sight. Transponders embedded inside paper labels ("RFID labels") assist businesses in product identification, control, tracking and security and are used in a wide variety of applications including:

Airline baggage management

Library systems and rental services

Retail, including electronic article surveillance

Supply chain logistics

Postal and parcel tracking services

Personnel identification and ticketing

Waste management

Vehicle identification

Fraud control and identification

Methods of manufacture of RFID labels are known. For example, U.S. Pat. No. 6,451,154 describes a method of making RFID labels comprising: (a) providing a plurality of RFID inlets, each including a chip (and antenna), on a first web; (b) covering the RFID inlets with a second web to provide a composite web; (c) providing pressure sensitive adhesive on a portion of one of the webs that will be an exterior portion of a label once ultimately formed; (d) verifying the functionality of, or programming, the chips prior to formation of the composite web; and, (e) acting on the composite web so as to provide the composite web into labels having a top face, and a bottom face with pressure sensitive adhesive. Step (b) is practiced by laminating the first and second webs by passing them between laminating rolls without harming the RFID inlets by providing a recess in at least one of the laminating rolls in alignment with the RFID inlets. The method may further comprise (f) imaging variable indicia on the top face. High speed practice of the method is possible; that is (a)-(e) may be practiced at a rate of at least about 100 feet per minute (e.g. up to about 300 ft./min.) and also typically (f) is practiced after (e).

The method described by U.S. Pat. No. 6,451,154 uses conventional web moving equipment and is designed for high volume RFID label production.

An alternative process of manufacturing RFID labels is to convert RFID tag to RFID labels in batches. This batch process is meant for specific batches of labels, as requested by the customer e.g. shipping labels related to say, one particular container or even a few containers for a specific shipment or shipping labels for one particular flight. Such a specific batch conversion of RFID tags to RFID labels is unlike the invention described in U.S. Pat. No. 6,451,154. In the batch conversion of RFID labels, the RFID tags and label liner are fed together at one point to convert the RFID tags into RFID labels. Each RFID tag must be accurately embedded onto each paper label and then encoded and have the bar codes printed in the same process. Unlike the invention described by U.S. Pat. No. 6,451,154, the RFID tags are embedded one by one onto a liner of labels spaced apart at regular intervals or "pitch" so that each RFID tag is embedded onto a label.

Irrespective of whether it is a production of a high volume RFID labels or production of a batch of RFID labels, practitioners of the science of making RFID labels are aware that there is a "sweet spot" for embedding the RFID tag as well as placement of printer/encoder within the label.

In the batch process of RFID tag to RFID label conversion, the making of RFID labels is made difficult due to the different sizes of each batch of labels, again due to specific customer requirements. The current practice used in batch conversion of RFID tags to RFID labels is a manual method of "meeting, matching and sticking". Much set up time is spent to ensure the process of RFID tag to RFID label conversion is accurately carried out for one batch. When the label size is changed for the next batch of RFID labels, set up time is again incurred. The current manual method is not only time consuming and results in high wastage. Furthermore, once the "meeting, matching and sticking" has been carried out, there is no assurance that the calibrations remains the same throughout the entire batch. There is therefore the possibility of the RFID tags not embedded correctly onto the RFID labels in the "sweet spot" resulting in more defective RFID labels. The next batch of RFID tag to RFID label conversion must again undergo the "meeting, matching and sticking" manual method, even though the size of the labels may be the same. Thus the current method of "meeting, matching and sticking" to convert RFID tags to RFID labels not only result in high wastage and man hour costs, but is also complicated, and not user friendly.

The problems associated with batch conversion of current RFID tag to RFID label are as follows:

High wastage of material;

Too many processes in converting RFID tag to RFID label;

Micro-processing circuit may be damaged during conversion;

Problem of Pitch control i.e. distance between RFID tag and label;

If the elements of a RFID tag are not converted accurately, a high level of wastage would result.

This invention is concerned with addressing the problems arising from pitch control faced in the current RFID tag to RFID label conversion batch process. This problem arises as RFID tags have to be embedded in paper labels and is exacerbated when for each batch, the label size (or dimensions) vary, these label sizes being specified by the end users. In current methods of embedding RFID tag onto paper labels to produce RFID labels, difficulty lies in that pitch control is always variable according to customer requirements i.e. the size of the label varies and therefore the size of paper labels of each batch may vary.

Current methods of batch embedding a RFID tag onto a paper label is carried by a procedure of "meet, match and stick" which results in high material wastage and additional man hours. This is primarily because the speed of dispensing of the RFID tags which comes in a roll has to be matched to the speed of dispensing of the paper labels which also comes in a roll such that one RFID tag is embedded onto one paper label at the correct location in the paper label as the liner (which is made up of the eventual labels) rolls out. Since each batch of RFID labels is different in dimensions, a trial and error procedure has to be adopted for each batch. Even in the course of running a batch to convert RFID tags to RFID labels, there would be some spoilage due to inaccurate embedding of the RFID tags onto the labels. Consequently, this has resulted in much wastage and high man hour costs.

The inventors have researched into the problem of embedding a RFID tag accurately onto a paper label for batch conversion of RIFD tags to RFID labels. The inventors have proposed a method for accurate embedding of RFID tags onto paper labels through improved pitch control by using sensors to detect certain markers made on the label. The invention will ensure lower costs of labor/man-hour, improved efficiency of production/conversion process and reduced wastage during tag-label conversion. More fundamentally, the invention would result in a significant reduction of the costs of RFID labels, thus making RFID labels less costly in use, thereby making RFID labels more attractive to use in manufacturing, logistics and other hostile environment where bar code labels may not perform as well

SUMMARY OF THE INVENTION

It is an object of the present invention to provide a low cost method for a batch of RFID tag to be embedded accurately onto a paper label for RFID tag to RFID label conversion through accurate pitch control even though each batch uses labels of different sizes. In this manner, reduction of wastage of materials as well as labour costs is achieved.

According to the first aspect of the invention, a system to embed a RFID tag onto a label in a liner for the purpose of batch conversion of RFID tag to RFID label is provided, the system having a RFID tag dispenser having a plurality of RFID tags, a liner having a plurality of labels spaced apart, roller modules to ensure proper alignment of the liner, driver roller and electrical motor to move the liner and RFID tags forward, a bar code printer for printing of bar codes as well as to move the liner forward, the system further having:
  each label marked with pitch marks to denote the beginning and ending of each label,
  a pitch mark sensor; and
  a PLC Controller;

wherein the pitch mark sensor detects the position of the pitch marks of a first label, the pitch mark sensor sends a signal to the RFID tag dispenser to issue a RFID tag, the issue of the RFID tag moving the plurality of RFID tags along towards the liner, causing a first RFID tag to be embedded onto the first label to produce a first RFID label on which information is further encoded and printed onto the RFID label, the PLC Controller then moves a second RFID tag towards the liner so that a second RFID tag is embedded onto a second label in the liner and so on.

Preferably, the system has a second sensor, the second sensor being a RFID dispensing sensor.

Preferably, the pitch mark sensor is a photoelectric sensor.

Alternatively, the pitch mark sensor is an optical sensor.

Preferably, the second sensor, being the RFID dispensing sensor is a photoelectric sensor.

Alternatively, the second sensor, being the RFID dispensing sensor is a counting sensor.

Preferably, the pitch mark is an eye mark.

Alternatively, the pitch mark can be a registration mark or a pin hole or a bump or an indentation.

According to the second aspect of the invention, a method to embed a RFID tag onto a label in a liner for the purpose of batch conversion of RFID tag to RFID label for a system is provided, the system having at least a RFID tag dispenser having a plurality of RFID tags, a liner having a plurality of labels, each label spaced apart, a bar code printer to move the liner forward, a pitch mark sensor to detect the position of each pitch mark of the label in the liner, said pitch mark sensor linked to a PLC Controller, the method consisting of the following steps:
  marking each label with pitch marks to denote the beginning and ending of each label,
  detecting the pitch marks of the first label by the pitch mark sensor;
  transmitting a signal from the pitch mark sensor to the PLC Controller to move a first RFID tag towards the first label for embedding;
  embedding the first RFID tag onto the first label to form the first RFID label;
  moving the first RFID label forward towards the bar code printer and driver roller for printing and encoding,
  moving a second label forward to the pitch mark sensor;
  detecting the pitch marks of the second label by the pitch mark sensor,
  transmitting a signal from the pitch mark sensor to the PLC Controller to cause the RFID tag dispenser to issue a RFID tag,
  causing a second RFID tag to move towards the second label for embedding, and so on until the RFID tags are all embedded onto the labels and information encoded and printed onto the RFID labels.

Preferably, the method includes the use of a second sensor, the second sensor being a RFID dispensing sensor.

BRIEF DESCRIPTION OF THE DRAWINGS

For a better understanding of the invention, its advantages, and the objects attained by its use, reference should now be made to the accompanying drawings. The accompanying drawings illustrate one or more embodiments of the invention and together with the description herein, serve to explain the workings and principles of the invention.

BEST MODE FOR CARRYING OUT THE INVENTION

The inventors having studied the problems associated with batch conversion of RFID tags to RFID labels have proposed using sensors to detect the exact location for the embedding of a RFID tag onto a label and using sensors to control the speed of movement of RFID tags and liner.

Figure 1:
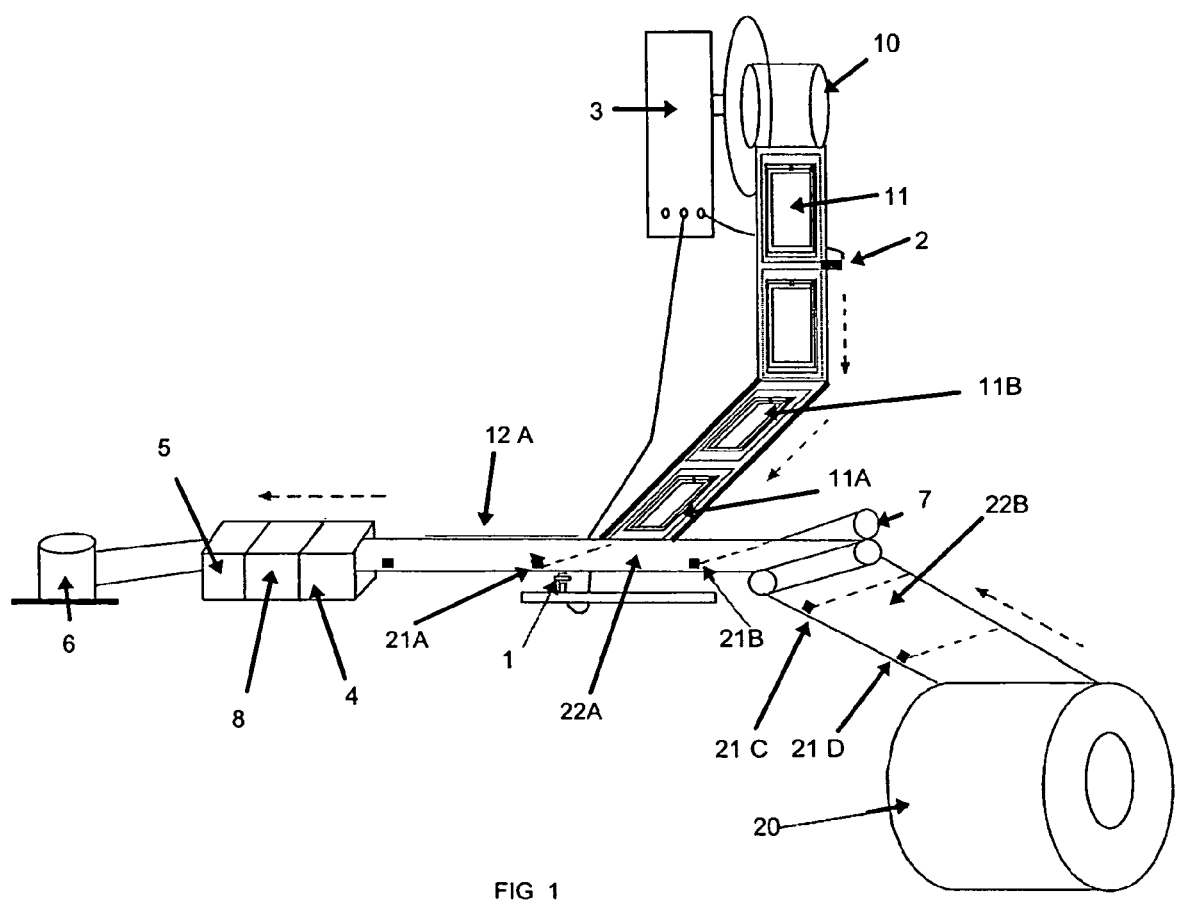
FIG. 1 is a diagram of an embodiment of a system using the batch process to convert RFID tags to RFID labels, as described in this invention.

FIG. 1 shows the type of equipment used in the batch process for convert RFID tag to RFID label, and which can be described as follows:

RFID tag dispenser 10 (which dispenses RFID tags 11)

Liner 20 (which have "pitch marks" 21 for pitch control and to denote dimensions of the labels )

Roller Modules 7 (to ensure proper alignment of liner 20)

Driver Roller 8 (to ensure proper alignment of liner 20)

a "Pitch Mark" sensor 1 to detect the pitch marks 21 on the liner 20 a RFID dispensing sensor 2 to detect movement of the RFID tags 11 that are being embedded onto the liner 20 in order to dispense more RFID tags 11 from the RFID tag dispenser 10 a PLC Controller 3 connected to the "pitch mark sensor" 1 and RFID dispensing sensor 2 to control the entire process Bar Code Printer 4 to print the bar codes onto the RFID labels 12

Electrical motor 5 to move the liner, onto which the RFID tags 11 are to be embedded Re-winder 6 (to wind the finished RFID labels 12)

The arrows with broken lines indicate direction of movement of the labels 22, RFID tags 11 and RFID labels 12.

Figure 2A:
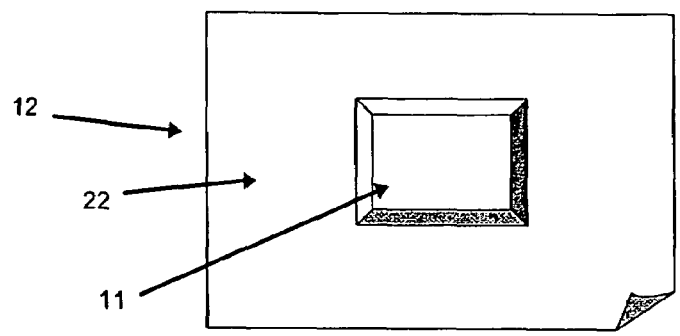
FIG. 2 is a diagram of the approximate position of the RFID tag embedded within a RFID label, which is shown in three different sizes, as shown in FIG. 2(A) and FIG. 2(B) and FIG. 2(C).
Figure 2:
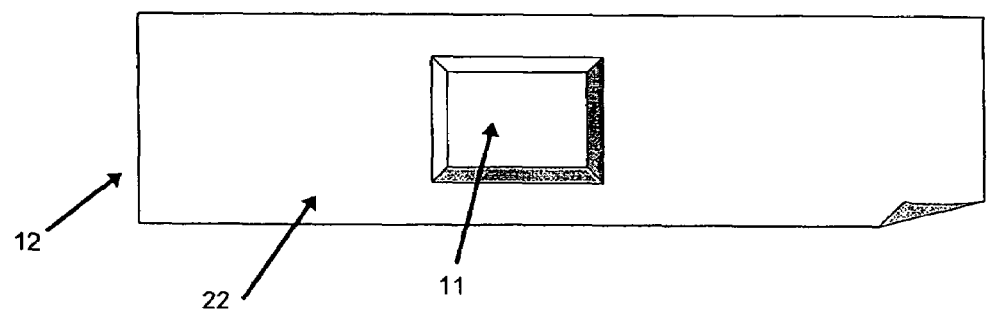
Figure 2:
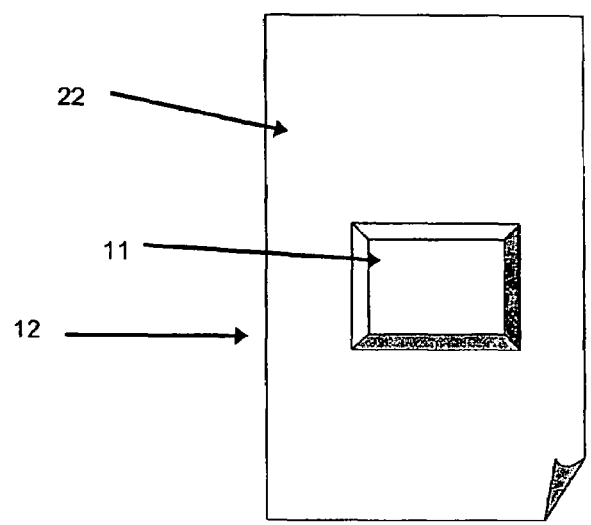

Referring to FIG. 2, RFID labels 12 are converted using labels 22 of different dimensions, the label dimensions being specified in accordance to the requirements of the end-user (customer). The RFID labels 12 would also have to be encoded with specific information as required by the customer. RFID labels 12 therefore comes in many sizes. Illustrated in FIG. 2 are RFID labels 12 of three different sizes, as shown in FIG. 2(A) and FIG. 2(B) and FIG. 2(C). The approximate position of each RFID tag 11 within each label 22, is also shown. The "sweet spot" for embedding the RFID tag 11 into the label 22 is therefore dependent on the dimensions of the label 22. The labels 22 comes in the form of a roll of liner 20. Similarly the RFID tags 11 comes in the form of a roll of RFID tags 11. Batch conversion of RFID tag 11 to RFID label 12 is carried out when the first RFID tag 11A is embedded onto the first label 22A, the second RFID tag 11B is embedded onto the second label 22B and so on until the batch of RFID tags 11 is converted to RFID labels 12 in the quantities required by the customer. Since both RFID tags 11 and liner 20 are in rolls, both rolls have to be dispensed at the correct speed to ensure accurate embedding of each RFID tag 11 onto each label 22 and in the correct position within the "sweet spot" for maximum efficiency of the RFID tag 11.

Figure 3:
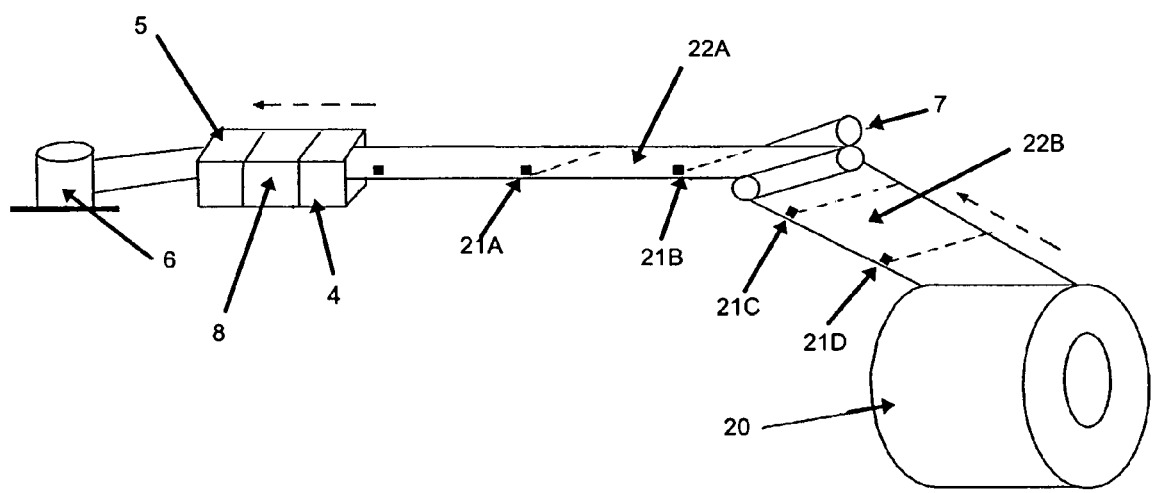
FIG. 3 is a diagram of the commencement of the batch process to convert RFID tags to RFID labels, as described by this invention.

FIG. 3 shows the commencement of the process of the invention. At the commencement of the process of the invention, adjustments are made to the electrical motor 5 and driver roller 8 ensure the bar code printer 4 speed is correct. The tension of the liner 20 is checked by adjustment of roller modules 7 and liner 20 to ensure it is taut such that the liner 20 is straight and horizontal. The liner 20 consists of labels 22 (in the dimensions specified by the customer). The liner 20 is also prepared with pitch marks 21 at regular intervals, the intervals being the beginning and end of each label 22, these intervals being referred to as "pitch". A test run is then made once the liner 20 is mounted onto the roller modules 7 so that the pitch mark sensor 1 can calibrate the pitch marks 21A, 21B, 21C, 21D and so on, of the labels 22A, 22B and so on in the liner 20. The pitch mark sensor 1 is linked to the PLC Controller 3, which is also connected to the RFID tag dispenser 10. A check of the pitch mark sensor 1 has to be performed to ensure the pitch mark sensor 1 can accurately detect the pitch marks 21A, 21B, 21C, 21D and so on. In the main embodiment, which is described herein, one pitch mark sensor 1 is described and the pitch mark sensor 1 is located below the liner 20. However, the pitch mark sensor 1 can also be located above the liner 20 or in any position best suited to detect the pitch mark 21. It is possible that more than one pitch mark sensor 1 be used in this invention. It is also possible that one pitch mark sensor 1 be located below the liner 20 and one pitch mark sensor 1 be located above the liner 20.

Figure 4:
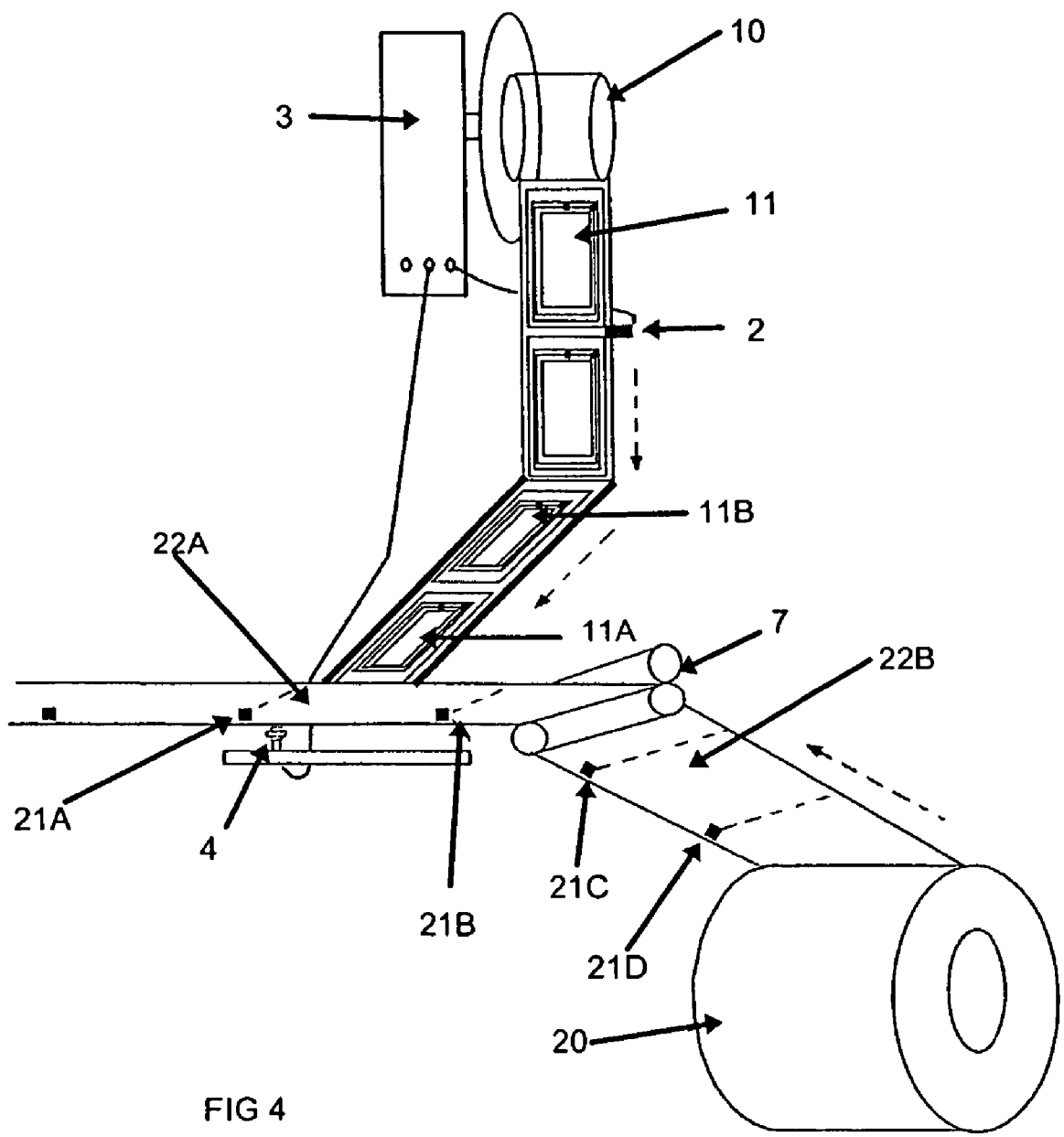
FIG. 4 is a diagram of an intermediate stage of the batch process to convert RFID tags to RFID labels, as described by this invention.

FIG. 4 shows stage 2 of the process of the invention. The RFID tags 11 are then mounted on the RFID tag dispenser 10. The RFID tag dispenser 10 has a RFID dispensing sensor 2 which is linked to the PLC Controller 3. When a label 22 is moved over the pitch mark sensor 1, the pitch mark sensor 1 detects the pitch marks 21A, 21B which indicates the surface area of a label 22. A signal is then sent by the pitch mark sensor 1 to the PLC Controller 3 which then send a signal to the RFID dispensing sensor 2. The RFID dispensing sensor 2 will send a signal to the RFID tag dispenser 10 to issue another RFID tag 11, thus moving the next RFID tag 11B into position for embedding onto the next label 22B (with pitch marks 21C, 21D). The speed of issue of RFID tags 11 from the RFID tag dispenser 10 is now aligned and synchronized to the speed of the liner 20. This is done by calibrating the speed of the liner 20 and the RFID tag dispenser 10 so that each RFID tag 11 can be embedded onto each label 22 in the "sweet spot" of the label 22 at the embedding stage of the process. This calibration is carried out by the PLC Controller 3 which synchronizes the speed of issue of RFID tags 11 from the RFID tag dispenser 10 with the speed of movement of the liner 20 so that the first RFID tag 11A is embedded onto the "sweet spot" of the first label 22A before the second RFID tag 11B is embedded to the second label 22B and so on. At this stage, care is taken to ensure the tension of the RFID tags 11 is not too loose or too tight as either situation could result in damage to the chip in the RFID tag 11.

Figure 5:
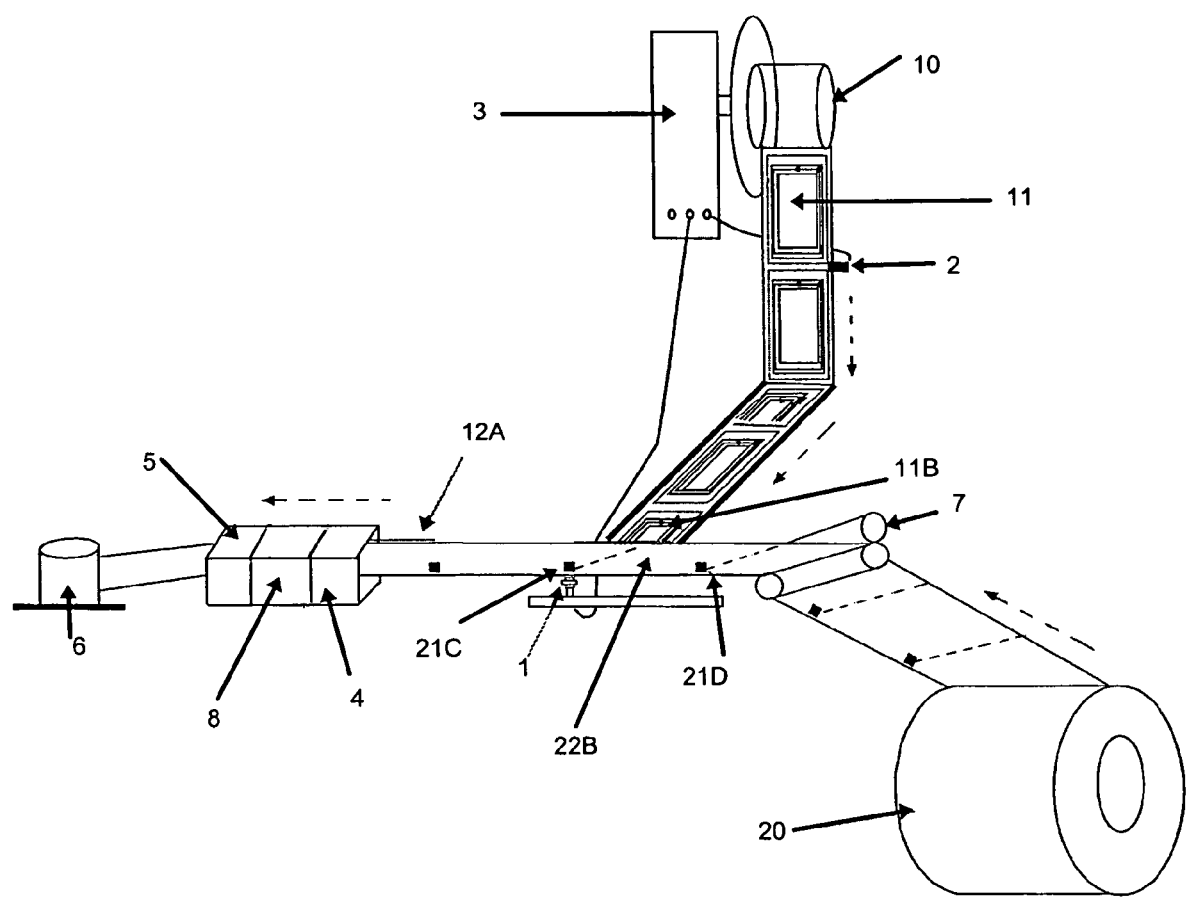
FIG. 5 is a diagram of the final stage of batch the process to convert RFID tags to RFID labels, as described by this invention.

FIG. 5 shows the process once it is running. As described earlier the liner 20 moves towards the bar code printer 4, the pitch marks 21A, 21B of a particular label 22 in the liner 20 is detected by the pitch mark sensor 1. A RFID tag 11 is then moved forward from the RFID tag dispenser 10 and embedded onto the "sweet spot" of the label 22. The label 22A embedded with the RFID tag 11A (now a RFID label 12A) is then moved along (to be encoded at the bar code printer 4). The next pitch marks 21C, 21D of the second label 22B is then detected by the pitch mark sensor 1. A signal is sent by the pitch mark sensor 1 to the PLC Controller 3. In turn, the PLC Controller 3 sends a signal to the RFID dispensing sensor 10, causing a RFID tag 11 to be issued from the RFID tag dispenser 10. The next RFID tag 11B to be embedded is then moved forward to be embedded onto the second label 22B. The entire process of embedding a RFID tag 11 onto the label 22 to form the RFID label 12 is controlled by the PLC Controller 3 which receives signals from both the pitch mark sensor 1 and RFID dispensing sensor 10 and which in turn control the speed of movement of the liner 20 and the speed of issue of RFID tag dispenser 10.

After the RFID tag 11 has been embedded onto the label 22 to form the RFID label 12, the RFID label 12 moves to the next stage. At this stage, the RFID label 12 is moved to the bar code printer 4 and the bar code is printed onto the RFID label 12 and the RFID tag 11 is also encoded. The bar codes printed and information encoded onto the RFID label 12 is specific for that batch, again in accordance to the requirements of the customer. The finished RFID label 12 is then moved forward by electrical motor 5, and rewound into a roll by re-winder 6.

The pitch marks 21A, 21B, 21C and 21D and so on can be an eye mark or any dot or any type of marking. The pitch marks 21A, 21B, 21C and 21D can also be perforated pin holes or bumps or indentations.

The pitch mark sensor 1 can be an optical sensor or a photoelectric sensor. The RFID dispensing sensor 2 can be a photoelectric sensor. The RFID dispensing sensor 2 could also be a counter.

Although the process described involves the use of an pitch mark sensor 1 and a RFID dispensing sensor 2, the role of the RFID dispensing sensor 2 is secondary in that it enables the process to be carried out faster. It is possible for batches of RIFD tags 11 to RFID label 12 conversion to be carried out only with the use of pitch mark sensor 1.

While an embodiment of the invention have been described, it should be apparent, however, that various modifications, rearrangements, substitutions alterations and adaptations to those embodiments may occur to persons skilled in the art with the attainment of some or all of the advantages of the present invention. Accordingly, it should be clearly understood that the present invention is not intended to be limited by the particular features and structures hereinbefore described and depicted in the accompanying drawings. It is therefore intended to cover all such modifications, alterations and adaptations without departing from the scope and spirit of the present invention as defined by the appended claims.

ADVANTAGEOUS EFFECTS OF THE INVENTION

The invention will assist in reduction of both material wastage and extensive labor costs associated with the current practice of batch embedding a RFID tag onto a paper label by the manual procedure of "meet, match and stick".

The invention is also less complicated and user friendly and offers faster turn around for converting separate batches of RFID tags to RFID labels. As a result, the costs of RFID labels would be significantly reduced thus making RFID labels a more favoured option in manufacturing, logistics and other hostile environment where bar code labels may not perform as well.

The invention claimed is:

1. A system to embed a RFID tag onto a label in a liner for batch conversion of RFID tag to RFID label, the system having at least a RFID tag dispenser having a plurality of RFID tags, a liner having a plurality of labels spaced apart, roller modules to ensure proper alignment of the liner, driver roller and electrical motor to move the liner and RFID tags forward, a bar code printer for printing of bar codes as well as to move the liner forward, the system further comprising:
   each label marked with pitch marks to denote
   a beginning and ending of each label,
   a pitch mark sensor; and
   a PLC Controller;
wherein the pitch mark sensor detects a position of the pitch marks of a first label, the pitch mark sensor sends a signal to the RFID tag dispenser to issue a RFID tag, the issue of the RFID tag moves the plurality of RFID tags along towards the liner, causing a first RFID tag to be embedded onto the first label to produce a first RFID label on which information is further encoded and printed onto the first RFID label, the PLC Controller then moves a second RFID tag towards the liner so that a second RFID tag is embedded onto a second label in the liner and so on.

2. The system of claim 1, further comprising a second sensor, the second sensor being a RFID dispensing sensor.

3. The pitch mark sensor of the system of claim 1 or claim 2, wherein said pitch mark sensor is a photoelectric sensor.

4. The pitch mark sensor of the system of claim 1 or claim 2, wherein said pitch mark sensor is an optical sensor.

5. The system as claimed in claim 2, wherein said RFID dispensing sensor is a photoelectric sensor.

6. The system as claimed in claim 2, wherein said RFID dispensing sensor is a counting sensor.

7. The system as claimed in claim 1 or claim 2, wherein said pitch mark is an eye mark.

8. The system as claimed in claim 1 or claim 2, wherein said pitch mark is a registration mark.

9. The system as claimed in claim 1 or claim 2, wherein said pitch mark is a tiny perforation.

10. The system as claimed in claim 1 or claim 2, wherein said pitch mark is a bump.

11. The system as claimed in claim 1 or claim 2, wherein said pitch mark is an indentation.

12. A method to embed a RFID tag onto a label in a liner for batch conversion of RFID tag to RFID label, the method comprising the following steps:
   providing a pitch mark sensor, a PLC Controller, a bar code printer, a drive roller, a RFID tag dispenser and a plurality of labels;
   marking each label with pitch marks to denote a beginning and ending of each label,
   detecting the pitch marks of a first label with said pitch mark sensor;
   transmitting a signal from said pitch mark sensor to said PLC Controller to move a first RFID tag towards said first label for embedding;
   embedding said first RFID tag onto said first label to form a first RFID label;
   moving said first RFID label forward towards said bar code printer and driver roller, for printing and encoding,
   moving a second label forward to said pitch mark sensor;
   detecting the pitch mark of said second label with said pitch mark sensor,
   transmitting a signal from said pitch mark sensor to said PLC Controller to cause said RFID tag dispenser to issue a RFID tag,
   causing a second RFID tag to move towards said second label for embedding, and so on until the RFID tags are all embedded onto the labels and information encoded and printed onto the RFID labels.

13. A method to embed a RFID tag onto a label in a liner for batch conversion of RFID tag to RFID label the method comprising the following steps:

provewriting a pitch mark sensor, a PLC Controller, a bar code printer, a drive roller, a RFID tag dispenser, a plurality of labels and a RFID dispensing sensor;

marking each label with pitch marks to denote a beginning and ending of each label, detecting the pitch marks of a first label with said pitch mark sensor;

transmitting a signal by said pitch mark sensor to said PLC Controller to move a first RFID tag towards said first label for embedding, embedding said first RFID tag onto said first label to form the first RFID label;

moving said first RFID label forward towards said bar code printer for printing and encoding;

moving a second label forward to said pitch mark sensor;

detecting the pitch mark of said second label with said pitch mark sensor, transmitting a signal to said PLC Controller;

transmitting a signal from said PLC Controller to said RFID dispensing sensor, causing said RFID tag dispenser to issue a RFID tag from said RFID tag dispenser, moving a second RFID tag towards a second label, embedding said second RFID tag onto said second label to form a second RFID label;

and so on until the RFID tags are all embedded onto the labels and information encoded and printed onto the RFID labels.

* * * * *